under 35 U.S.C. 154(b) by 0 days.

United States Patent
Liu et al.

(10) Patent No.: US 9,158,817 B2
(45) Date of Patent: *Oct. 13, 2015

(54) ENHANCING ONLINE QUERYING SERVICE USING CLIENT MEMORIZATION

(71) Applicant: International Business Machines Corporation, Armonk, NY (US)

(72) Inventors: Su Liu, Round Rock, TX (US); George F. Ramsay, III, Elgin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/104,836

(22) Filed: Dec. 12, 2013

(65) Prior Publication Data
US 2014/0108454 A1 Apr. 17, 2014

Related U.S. Application Data

(63) Continuation of application No. 13/169,183, filed on Jun. 27, 2011.

(51) Int. Cl.
*G06F 17/30* (2006.01)
(52) U.S. Cl.
CPC .... *G06F 17/30477* (2013.01); *G06F 17/30457* (2013.01)

(58) Field of Classification Search
USPC ............. 707/607, 609, 705, 713, 158, 781
See application file for complete search history.

(56) References Cited

U.S. PATENT DOCUMENTS

| | | | |
|---|---|---|---|
| 8,271,357 B2* | 9/2012 | Mohan | 705/27.1 |
| 2007/0006120 A1 | 1/2007 | Proebsting et al. | |
| 2009/0094337 A1 | 4/2009 | Dias | |
| 2011/0055202 A1 | 3/2011 | Heimendinger | |
| 2012/0331033 A1 | 12/2012 | Liu et al. | |

FOREIGN PATENT DOCUMENTS

JP 0027094884 12/2007

* cited by examiner

*Primary Examiner* — Sana Al Hashemi
(74) *Attorney, Agent, or Firm* — Thomas Tyson; Gregory K. Goshorn; Greg Goshorn, P.C.

(57) ABSTRACT

Provided are techniques for transmitting a first query from a query agent in a client computing device to an answering agent in a server computing device; receiving, at the query agent from the answering agent, a first response to the first query; saving the first query in conjunction with the first response in a computer readable storage medium; intercepting, by a query service agent, a second query from the query agent to the answering agent; correlating the second query to the first query; and transmitting to the query agent from the query service agent the first response in response to the second query.

13 Claims, 4 Drawing Sheets

ENHANCING ONLINE QUERYING SERVICE USING CLIENT MEMORIZATION

CROSS-REFERENCES TO RELATED APPLICATIONS

The present application is a continuation and claims the benefit of the filing date of an application entitled, "Enhancing Online Querying Service Using Client Memorization" Ser. No. 13/169,183, filed Jun. 27, 2011, assigned to the assignee of the present application, and herein incorporated by reference.

BACKGROUND OF THE INVENTION

The claimed subject matter relates generally to information retrieval and, more specifically, to techniques for client-side searching for data also stored on a server. Online querying for information is a service that is important for online business and consumers. Frequently, the quality of such services is impacted due to issues such as, but not limited to inadequate network bandwidth, dropped network signals and unpredicted server downtime.

SUMMARY

Provided are techniques for a client-side storage of query-answer records to enable information retrieval during times of server/network downtime as well as to potentially speedup information retrieval in general during, network/server uptime by reducing network traffic and server work load. Also provided are querying options that specify multiple information access rules and automated optimizing settings.

Provided are techniques for transmitting a first query from as query agent in a client computing device to an answering agent in a server computing device; receiving, at the query agent from the answering agent, a first response to the first query; saving the first query in conjunction with the first response in a computer readable storage medium; intercepting, by is query service agent, a second query from the query agent to the answering agent; correlating the second query to the first query; and transmitting to the query agent from the query service agent the first response in response to the second query.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
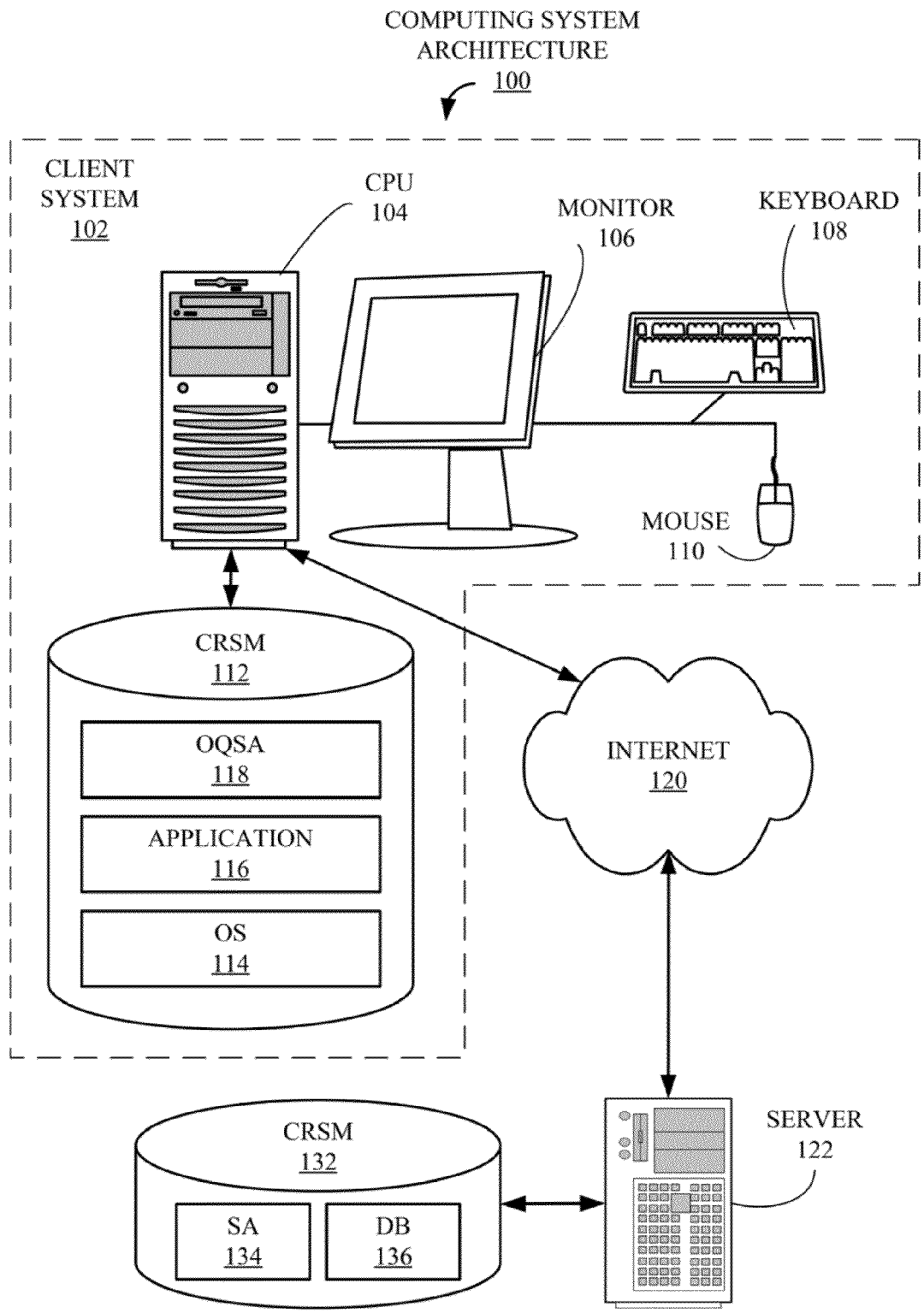
FIG. 1 is a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, in a typical online service, a querying agent transmits a query from a client to an answer agent running on a server. The answer agent on the server side retrieves queried information from a database and sends the information back to the client. For example, an error-diagnostic server receives an error ID sent by a client and returns correlated diagnostic information back to the client. In another example, an online French-English dictionary service may generate correlated pairs of English/French words. This type of query/answer scenario depends upon a stable network connection, adequate network bandwidth and a reliable server. Any network or server problem may result in a failure of the online service.

Some systems address quality issues by enabling a client to access information offline by replicating information on the client side. However, this technique typically necessitates the replication and synchronization of entire server information on the client side during periods when both networks and servers are available. Such replication and synchronization adds overhead on client-server communication, increases central processing unit (CPU), or processor, time and storage and adds to network traffic. Some email client applications in particular may have performance problems because of such an "off-line replica" synchronization feature.

Turning now to the figures, FIG. 1 is a block diagram of an example of a computing system architecture 100 that may incorporate the claimed subject matter. A client system 102 includes a central processing unit (CPU) 104, which may include one or more processors (not shown), coupled to a monitor 106, a keyboard 108 and a pointing device, or "mouse," 110, which together facilitate human interaction with computing system 100 and client system 102. Also included in client system 102 and attached to CPU 104 is a computer-readable storage medium (CRSM) 112, which may either be incorporated into client system 102 i.e. an internal device, or attached externally to client system 102 by means of various, commonly available connection devices such as but not limited to, a universal serial bus (USB) port (not shown). CRSM 112 is illustrated storing an operating system (OS) 114 and an example of a computer software application, Or "application," 116 that is used throughout Description to illustrate the claimed subject matter. It should be noted that a typical computing system would include more than one application, but for the sake of simplicity only one is shown. Also stored on CRSM 112 for execution on one or more processors associated with CPU 104 is an Online Query Service Agent (OQSA) 118, which in the following examples implements aspects of the claimed subject matter. In one embodiment, application 116 may be a "query agent" that handles, or centralizes, queries from multiple applications (not shown). In such an embodiment, a query agent and OQSA 118 may be integrated. OQSA 118 is described in more detail below in conjunction with FIGS. 2-4.

Client system 102 is connected to the Internet 120, which is also connected to a server computer, or "server," 122. Typically, server 122 would also include a CPU, monitor, keyboard and pointing device, which, for the sake of simplicity, are not illustrated. Although in this example, client system 102 and server 122 are communicatively coupled via the Internet 120, they could also be coupled through any number of communication mediums such as, but not limited to, a local area network (LAN) (not shown). Coupled to server 122 is a CRSM 132, which in this example, stores a server agent (SA) 134 and a database (DB) 136. Further, it should be noted there are many possible computing system configurations, of which computing system 100 is only one simple example.

Figure 2:
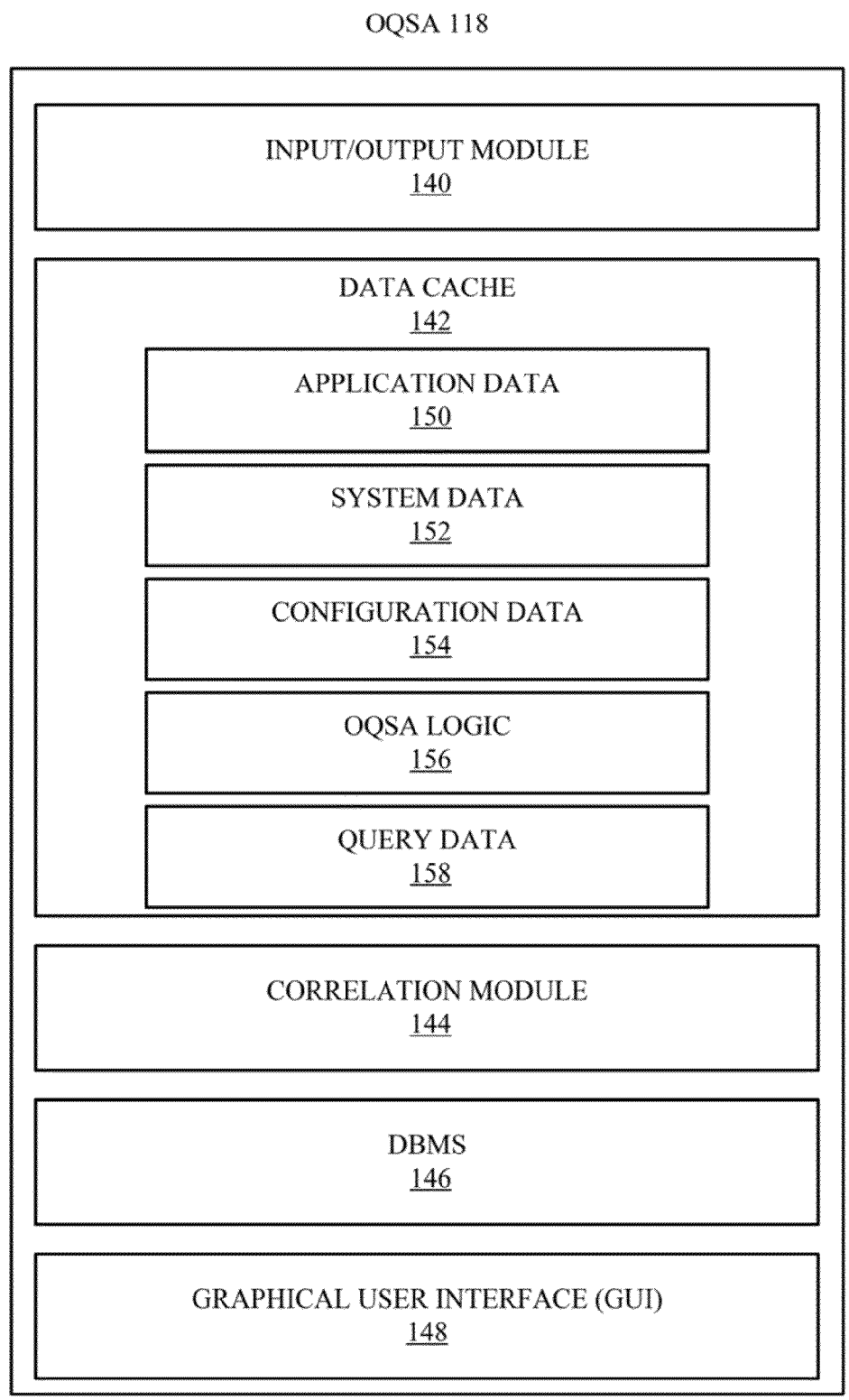
FIG. 2 is a block diagram of an Online Query Service Agent (OQSA), first introduced in FIG. 1, in more detail.

FIG. 2 is a block diagram of OQSA 118, first introduced, in FIG. 1, in more detail. In the following example, logic associated with OQSA 118 is stored on CRSM 112 (FIG. 1) of client system 102 (FIG. 1) and executed on one or more processors associated with CPU 104 (HG. 1).

OQSA 118 includes an input/output (I/O) module 140, a data cache 142, a correlation module 144, a DBMS component 146 and a graphical user interface (GUI) module 148. It should be understood that the claimed subject matter can be implemented in many types of computing systems and data storage structures but, for the sake of simplicity, is described only in terms of computer 102 and system architecture 100 (FIG. 1). Further, the representation of backup monitor in FIG. 2 is a logical model. In other words, components 140, 142, 144, 146 and 148 may be stored in the same or separates files and loaded and/or executed within system 100 either as a single system or as separate processes interacting via any available inter process communication (IPC) techniques.

I/O module 140 handles communication between OQSA 118 and other components of system 109. Data cache 142 is a data repository for information including, but not necessarily limited to, an application data section 150, a system data section 152, a configuration data section 154, OQSA logic 156 and Query data 158. Application data 150 stores information about applications that access OQSA 118 such as in this example application 116 (FIG. 1). System data 154 includes information about devices and communication media within computing system architecture 100, such as but not limited to, server 122 (FIG. 1), SA 134 (FIG. 1) and DB 136 (FIG. 1) that enables OQSA 118 to send and receive queries, replies and data from the other devices. Configuration data 156 includes information for controlling the operation of OQSA 118. Examples include, but are not limited to, parameters that control information access rules, refresh rates, data expiration times and automated optimization settings. OQSA logic 156 includes executable code for implementing the functionality of OQSA 118 (see FIGS. 3 and 4). Query data 158 stores the results of previously executed queries, including information on the query, the reply, the source of the reply and a timestamp indicating when the data was retrieved.

Correlation module 144 includes logic for the comparison of an intercepted query (see 254, FIG. 4) with both the server to which the query is directed and to previously executed queries stored in query data 158. DBMS 146 includes logic for the generation and execution of queries, primarily to Query data 158 but also to other databases such as DB 136. GUI component 148 enables users of client system 102 to interact with and to define the desired functionality of OQSA 118. Components 142, 144, 146, 148, 150, 152, 154, 156 and 158 are described in more detail below in conjunction with FIGS. 3-4.

Figure 3:
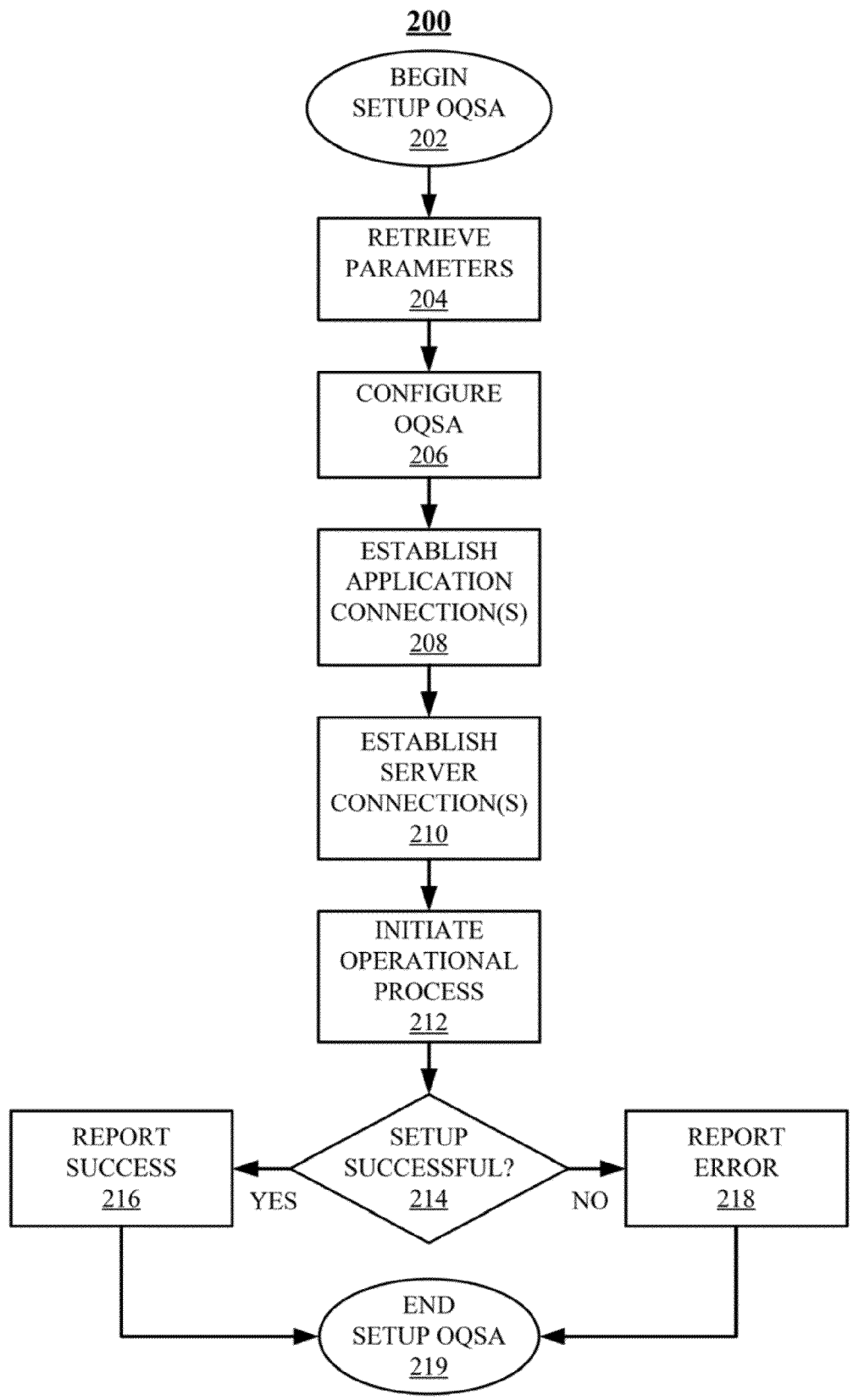
FIG. 3 is an example of a flowchart of a Setup OQSA process that implements aspects of the claimed subject matter.

FIG. 3 is an example of a flowchart of a Setup OQSA process 200 that implements aspects of the claimed subject matter. In this example, logic associated with process 200 is stored on CRSM 112 (FIG. 1) and executed on one or more processors (not shown) of CPU 104 (FIG. 1) of client system 102 (FIG. 1).

Process 200 starts in a "Begin Setup OQSA" block 202 and proceeds to a "Retrieve Parameters" block 204. During processing associated with block 204, parameters stored in data cache 142 (FIG. 2) are retrieved from CRSM 112. Examples of retrieved parameters include, but are not limited to, application data 150, system data 152 and configuration data 154, all described above in conjunction with FIG. 2. During a "Configure OQSA" block 206, the parameters retrieved during processing associated with block 204 are employed to configure operation of OQSA 118 (see 210).

During processing associated, with an "Establish Application Connection(s)" block 208, information associated with application data 150 is employed to establish connections between OQSA 118 application such as application 116 (FIG. 1) that are configured to utilize OQSA 118. Connections established during processing associated with block 208 enable queries from application 116 to be routed through OQSA 118. During processing associated with an "Establish Server Connection(s)" block 210, information associated with system data 152 and information gathered from applications during processing associated with block 208 is employed to establish connections with server agents on other computing devices, such as SA 134 (FIG. 1) on server 122 (FIG. 1). During processing associated with an "Initiate Operate Process" block 212, an Operate OQSA process (see 250, FIG. 4) is initiated on client system 102.

During processing associated with a "Setup Successful?" block 214, a determination is made as to whether or not the initiation of the operate process initiated during processing associated with block 212 was successful. If so, control proceeds to a "Report Success" block 216 during which appropriate entities are notified of the initiation od the operate process. Examples of entities that may receive notification are an administrator of client system 102 or server 122 and a log file (not shown). If during processing associated with block 214, a determination is made that the initiation of the operate process was not successful, notification of that is made to the appropriate entities during processing associated with a "Report Error" block 218. Finally, control proceeds to an "End Setup OQSA" block 219 during which process 200 is complete.

Figure 4:
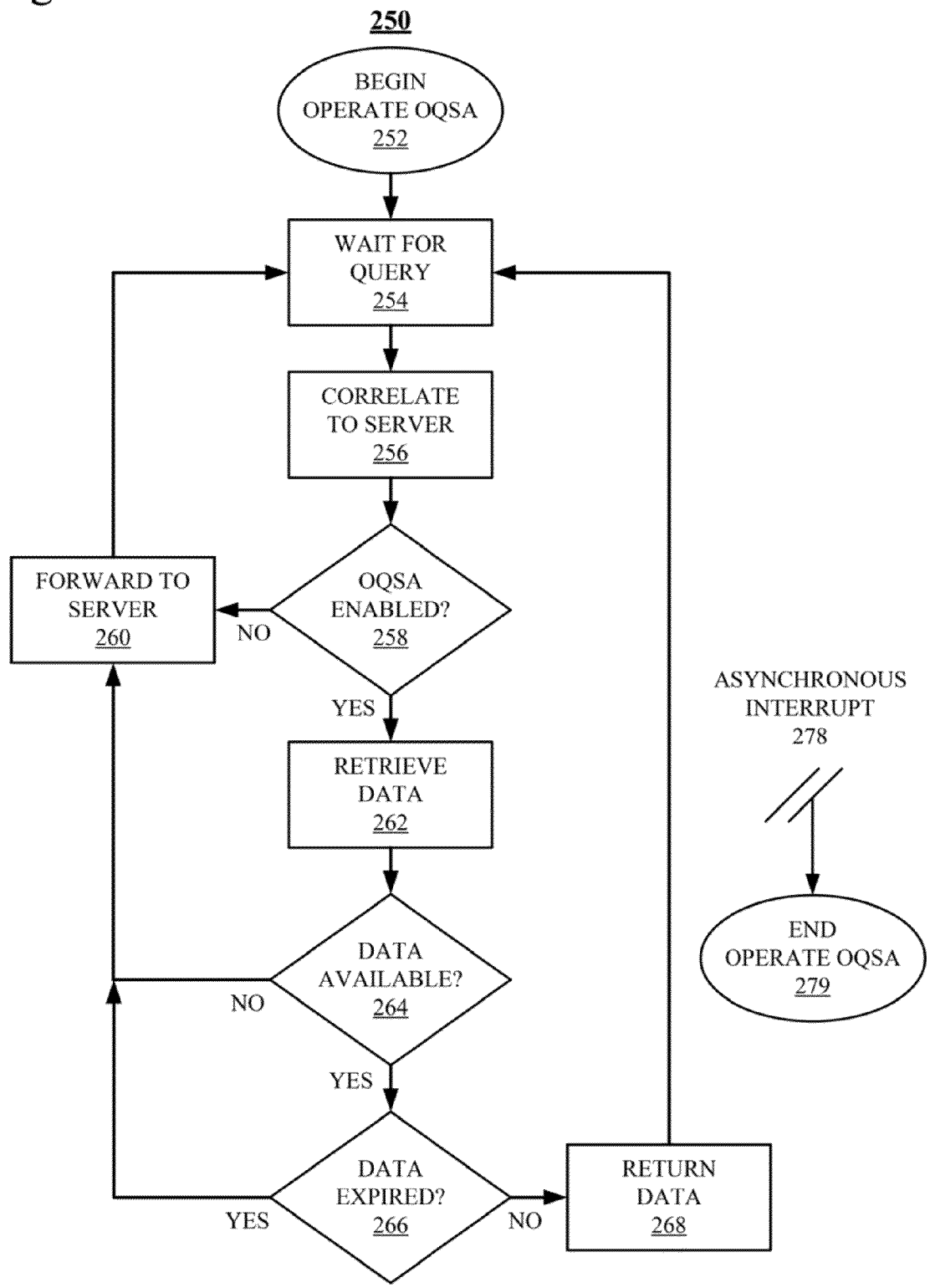
FIG. 4 is an example of a flowchart of an Operate OQSA process that implements aspects of the claimed subject matter.

FIG. 4 is an example of a flowchart of an Operate OQSA process 250 that implements aspects of the claimed subject matter. Like process 200 (FIG. 4), in this example, logic associated with process 250 (see 156, FIG. 2) is stored on CRSM 112 (FIG. 1) and executed on one or more processors (not shown) of CPU 104 (FIG. 1) of client system 102 (FIG. 1).

Process 250 starts in a "Begin Operate OQSA" block 252 and proceeds to a "Wait for Query" block 254. During processing associated with block 254, data queries from applications such as application 116 (FIG. 1) that have been routed through OQSA 118 (sec 208, FIG. 3) are intercepted. During processing associated, with a "Correlate to Server" block 256 (see 144, FIG. 2), the query received or intercepted during processing associated with block 254 is parsed to determine the particular server to which the query is directed.

During processing associated with an "OQSA Enabled?" block 258, a determination is made as to whether or not OQSA 118 is currently enabled to process queries from both application 116 and the particular server identified during processing associated with block 256. In this manner, the client-side search capabilities OQSA 118 may, depending upon current conditions, be turned on or off, typically implemented by a process (not shown) that monitors communication between OQSA 118 and applications and servers and signals OQSA 118 with a "bypass" signal. One example of a condition in which a server may disable the client-side search features of OQSA 118 is in the event of an active refresh of a target database, such as DB 136 (FIG. 1) of server 122. In this manner, the server can insure that an application receives current rather than stale data. One example in which an application may disable the features of OQSA 118 is a desire to ensure the most current data is retrieved. In one embodiment, an indication to disable a client-side search may be transmitted, by application 116, as a "bypass" parameter transmitted in conjunction with a search.

If, during processing associated with block 258, a determination is made that client-side search features of OQSA 118 are disabled, control proceeds to as "Forward to Server" block 260. During block 260, the query received, during processing associated with block 254 is transmitted to the server for processing. Control then returns to Wait for Query block 254 and processing continues as described above. If, during processing associated with block 258, a determination is made that client-side search features of OQSA 118 are enabled, control proceeds to a "Retrieve Data" block 262 during which an attempt is made to retrieve data corresponding to the received query.

During processing associated with a "Data Available?" block 264, a determination is made as to whether or not the data retrieval associated with block 262 was successful, i.e. the request data has previously been stored and is available in Query data 158 (FIG. 2). If not, control proceeds to Forward to Server block 260 and processing continues as described above. If, during processing associated with block 264 a determination is made that the request data is available, a determination is made as to whether or not the data is "stale" during processing associated with a "Data Expired?" block 266. This determination may be based upon a configurable parameter (see 154, FIG. 2) that specifies a time limit for data.

If, during processing associated with block 264 a determination is made that the data retrieved during processing associated with block 262 is current, control proceeds to a "Return Data" block 268. During processing associated with block 268, the data retrieved during processing associated with block 262 is returned to the application that initiated the query. In addition, an indication that the returned data is from the cached data (see query data 158, FIG. 2) may be returned in conjunction with the returned data. Control then returns to Wait for Query block 254 and processing continues as described above.

Finally, in the event of a shutdown of OQSA 118, OS 114 (FIG. 1) or client system 102, perhaps based upon a decision by a system administrator, an asynchronous interrupt 278 is generated and processed by OQSA 118. Interrupt 278 causes control to proceed to an "End Operate OQSA" block 279 during which process 250 is complete.

The terminology used herein is tier the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture. functionality, and operation of possible implementations of systems, methods and computer program products according to various embodiments of the present invention. In this regard, each block in the flowchart or block diagrams may represent a module, segment, or portion of code, which comprises one or more executable instructions fir implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    transmitting a first query to a database on a server from an application executing in a client computing device to an answering agent on the server computing device;
    receiving, at the application from the answering agent, a first response to the first query;
    saving the first query in conjunction with the first response in a computer readable storage medium;
    receiving, by a query service agent, a second query, requesting a second response, to the database from the application;
    determining the second query corresponds to the first query; and
    in response to determining that the second query corresponds to the first query, transmitting to the application from the query service agent the first response as a replacement for the second response to the second query.

2. The method of claim 1, further comprising, determining a third query does not con-elate to any query stored in the computer readable storage medium:
    transmitting the third query from the query service agent to the answering agent;
    receiving, at the application from he answering agent, a third response to the third query; and
    saving the third query in conjunction with the third response in a computer readable storage medium.

3. The method of claim 1, further comprising:
    calculating a time interval corresponding to a length of time between the first query and the second query; and
    if the time interval exceeds a configurable parameter, transmitting the second query to the answering agent;
    receiving, at the application from the answering agent, a second response to the second query; and
    saving the second query in conjunction with the second response in a computer readable storage medium.

4. The method claim 1, further comprising:
    detecting, by the query service agent, to bypass parameter transmitted in conjunction with the second query;
    disabling, in response to the bypass parameter, the correlating the second query to the first query and the transmitting to the application from the query service agent the first response in response to the second query;
    transmitting the second query to the answering agent;
    receiving, at the application from the answering agent, a second response to the second query; and
    saving the second query in conjunction with the second response in the computer readable storage medium.

5. The method of claim 1, further comprising:
    detecting, by the query service agent, a bypass signal from the answering agent;
    disabling, in response to the bypass signal, the correlating the second query to the first query and the transmitting to the application from the query service agent the first response in response to the second query;
    transmitting the second query to the answering agent;
    receiving, at the application from the answering agent, a second response to the second query; and
    saving the second query in conjunction with the second response in the computer readable storage medium.

6. The method of claim 1, wherein the application is a query agent handling queries from a plurality of applications.

7. The method of claim 1, the transmitting to the application from the query service agent the first response M response to the second query comprising transmitting the first response in conjunction with an indication that the first response is a cached response.

8. A method comprising:
    receiving, at a query service agent from the answering agent on a server computing device, a first response to a first query from an application executing on a client computing device;
    saving, by the query service agent, the first query in conjunction with the first response in to computer readable storage medium;

receiving, by a query service agent, a second query, requesting a second response, to the database from the application;

determining the second query corresponds to the first query; and in response to determining that the second query corresponds to the first query, transmitting to the application from the query service agent the first response as a replacement for the second response to the second query.

9. The method of claim 8, further comprising, determining a third query does not correlate to any query stored in the computer readable storage medium:

transmit the third query from the query service agent to the answering, agent;

receiving, at the application from the answering agent, to third response to the third query; and saving the third query in conjunction with the third response in a computer readable storage medium.

10. The method of claim 8, further comprising:

calculating a time interval corresponding to a length of time between the first query and the second query; and if the time interval exceeds a configurable parameter, transmitting the second query to the answering agent;

receiving, at the application from the answering agent, a second response to the second query; and saving the second query in conjunction with the second response in a computer readable storage medium.

11. The method of claim 8, further comprising:

detecting, by the query service agent, a bypass parameter transmitted in conjunction with the second query;

disabling, in response to the bypass parameter, the correlating the second query to the first query and the transmitting to the application from the query service agent the first response in response to the second query;

transmitting the second query to the answering agent;

receiving, at the application from the answering, agent, a second response to the second query; and saving the second query in conjunction with the second response in the computer readable storage medium.

12. The method of claim 8, further comprising:

detecting, by the query service agent, a bypass signal from the answering agent;

disabling, in response to the bypass signal, the correlating, the second query to the first query and the transmitting to the application from the query service agent the first response in response to the second query;

transmitting the second query to the answering agent;

receiving, at the application from the answering agent, a second response to the second query; and saving the second query in conjunction with the second response in the computer readable storage medium.

13. The method of claim 8, wherein the application is a query agent handling queries from a plurality of applications.

* * * * *